United States Patent

[11] 3,619,277

[72] Inventors: James Forrest Allen, deceased
late of Pennington, N.J. by Christina L. Allen, executrix;
Harold K. Latourette, Geneva, Switzerland
[21] Appl. No.: 877,581
[22] Filed: Nov. 26, 1969
Division of Ser. No. 265,020, Mar. 12, 1963, Pat. No. 3,509,218, which is a division of Ser. No. 118,269, June 20, 1961, abandoned
[45] Patented: Nov. 9, 1971
[73] Assignee: FMC Corporation
New York, N.Y.

[54] METHOD OF IMPROVING THE CREASE RESISTANCE OF A CELLULOSIC FABRIC
2 Claims, No Drawings

[52] U.S. Cl. .................................................. 117/139.4, 117/143 R

[51] Int. Cl. .................................................. D06m 15/00
[50] Field of Search .................................................. 117/139.4, 143 R; 8/116, 120

[56] References Cited
UNITED STATES PATENTS

| | | | |
|---|---|---|---|
| 2,524,399 | 10/1950 | Schoene et al. | 8/116 |
| 2,724,664 | 11/1955 | Gagarine et al. | 117/139.4 |
| 2,794,754 | 6/1957 | Schroeder | 117/139.4 |
| 3,068,123 | 12/1962 | Feldmann | 117/139.4 |
| 3,106,439 | 10/1963 | Valentine et al. | 117/139.4 X |

Primary Examiner—William D. Martin
Assistant Examiner—Theodore G. Davis
Attorneys—Milton Zucker, Eugene G. Seems and Frank Ianno ABSTRACT: A method of treating cellulosic fabrics with 2-hydroxyethyl vinyl sulfone.

METHOD OF IMPROVING THE CREASE RESISTANCE OF A CELLULOSIC FABRIC

This is a division of application Ser. No. 265,020, filed Mar. 12, 1963, now Pat. No. 3,509,218, which is a division of application Ser. No. 118,269, filed June 20, 1961, now abandoned.

This invention relates to a novel textile treating agent, and particularly to a method of improving the crease resistance of cellulosic fabrics by treating with 2-hydroxyethyl vinyl sulfone.

The novel compound of this invention may be obtained by dehydrochlorinating the product of the reaction between bis(2-hydroxyethyl)sulfide or sulfoxide, and chlorine, Bis(2-hydroxyethyl)sulfide is produced in a known manner from hydrogen sulfide and ethylene oxide. It is dissolved in water or in a solvent for the sulfide containing at least one mole of water per mole of sulfide. Chlorine gas is passed into the solution at a temperature of 0° to 39° C. Chlorination is stopped when free chlorine is detected at the surface of the solution. Even at low temperatures, this reaction is very rapid. When the sulfoxide is the starting reactant, the solvent may be water or an anhydrous liquid. Colorless, liquid 2-hydroxyethyl 2-chloroethyl sulfone is formed, and it may be purified by distilling off solvent and byproduct.

Conversion of 2-hydroxyethyl 2-chloroethyl sulfone to 2-hydroxyethyl vinyl sulfone is effected in a liquid solvent for the sulfone by the action of bases which are hydrogen chloride acceptors. In this reaction, hydrogen chloride is removed from the sulfone to leave 2-hydroxyethyl vinyl sulfone.

Many bases are suitable for dehydrochlorinating, including inorganic bases such as the alkali metal and alkaline earth metal hydroxides and carbonates and other basic water-soluble salts, and organic bases such as triethylamine, pyridine and aniline. For availability and economy, sodium hydroxide, sodium carbonate and sodium bicarbonate are the preferred reactants of this invention. When a strong base such as sodium hydroxide is used, the temperature of the dehydrochlorination reaction should be in the range of 0° C. to 25° C. The reaction goes to completion readily without further heating. Weaker bases require higher temperatures; for example, it is necessary to react the sulfone with sodium carbonate at a temperature of 60° to 70° C.

The dehydrochlorination reaction should preferably take place in a uniform liquid phase. Water is the most convenient solvent to use. Lower aliphatic alcohols and the chlorinated hydrocarbons are also quite suitable. Dehydrochlorination may be achieved although the base is not completely soluble in the liquid. With adequate mixing, a base that is insoluble in the solution may also be used. The product is a high boiling liquid, useful in improving the crease resistance of fabrics.

The following examples specifically illustrate the preparation and utility of this new composition:

EXAMPLE I

Preparation Of 2-Hydroxyethyl 2-Chloroethyl Sulfone

A mixture of 122 g. (1 mole) of bis (2-hydroxyethyl) sulfide and 72 g. (4 moles) of water was agitated and then cooled to 15° C. Chlorine gas was introduced into the mixture at a temperature between 15° and 20° until the mixture had a persistent yellow color. Excess water and hydrogen chloride were removed in vacuo on a boiling water bath. The colorless, moderately viscous crude product was then distilled. Boiling point: 159–162° C and at 0.35 mm.; $n_D^{25}$ 1.5010.

Anal. Calcd. for $C_4H_9ClO_3S$: Cl, 20.5 percent; S, 18.6 percent; Found: Cl, 20.6 percent; S, 18.8 percent

EXAMPLE II Preparation Of 2-Hydroxyethyl Vinyl Sulfone

Four moles (690 g.) of 2-hydroxyethyl 2-chloroethyl sulfone, prepared as in example I, was dissolved in 400 ml. of water and treated with 2 moles (212g.) of anhydrous sodium carbonate at room temperature, followed by heating to 60° to 70° C until the evolution of carbon dioxide ceased. Removal of water in vacuo and subsequent filtration gave 521 g. (96 percent of theoretical yield) of crude 2-hydroxyethyl vinyl sulfone. Distillation of the reaction mixture yielded 406 g. (75 percent of theoretical) of the refined product. Boiling point: 105–107°C at 0.25 mm; $n_D^{25}$ 1.4960. Anal. Calcd for $C_4H_8O_3S$: S, 23.5 percent Found: S, 23.8 percent.

EXAMPLE III Preparation Of 2-Hydroxyethyl Vinyl Sulfone

A solution of 172.6 g. (1 mole) of 2-hydroxyethyl 2-chloroethyl sulfone in 100 ml. of water was cooled to 10° C, and with sufficient cooling and stirring, 39.5 g. (0.99 moles) sodium hydroxide dissolved in 100 ml. of water was added. The temperature was held at 10° C. The reaction was essentially instantaneous. The water was removed in vacuo and the salt byproduct was filtered out. Distillation of the remaining liquid gave 77 g. (56.6 percent yield) of product having the same properties as given in example II.

EXAMPLE IV Textile Treatment

This example shows the utility of 2-hydroxyethyl vinyl sulfone in treating fabrics for crease resistance. A 100 g. aqueous solution containing 4.5 g. of 2-hydroxyethyl vinyl sulfone and 1.0 g. of sodium carbonate was applied to cotton fabric. The fabric was 80 threads/inch square, 4.0 yards/pound bleached, unfinished print cloth. Four feet of 9 inches width fabric was passed through the solution and then squeezed through rollers leaving about 70–80 percent moisture by weight of dry cloth. The cloth was dried for 4 minutes at 90°–100° C and cured for 4 minutes at 150–160° C. The cured fabric was rinsed in a water wash containing hydrogen peroxide and an alkali and dried again at about 85–100° C.

The sample was tested under ASTM D 1295–53 T procedures according to the MONSANTO CREASE RECOVERY TEST. A wet test, using the same procedures, was also run after soaking the specimen in distilled water for about 10 to 20 minutes.

The following data include the crease recovery angles and percent of crease recovery based on full recovery, or 180° return, for the treated specimen and for an untreated specimen:

|  | Treated | | Untreated | |
|---|---|---|---|---|
| Dry Crease Recovery | Angle | Percent | Angle | Percent |
| Warp | 111° | 61.6% | 83° | 46.1% |
| Fill | 124° | 68.9% | 94.3° | 52.4% |
| Wet Crease Recovery |  |  |  |  |
| Warp | 108° | 60.0% | 87° | 48.4% |
| Fill | 133° | 74.0% | 98° | 54.5% |

The foregoing description has included embodiments of the invention not to be construed as limiting except as indicated in the following claims.

We claim:

1. A method of improving the crease recovery of cellulosic fabrics comprising treating said fabric with an aqueous solution containing as the essential ingredient 2-hydroxyethyl vinyl sulfone, and heating said treated fabric at an elevated temperature.

2. The method of claim 1 wherein the treated fabric is heated to a temperature of 150° to 160° C.

* * * * *

UNITED STATES PATENT OFFICE
CERTIFICATE OF CORRECTION

Patent No. 3,619,277        Dated 11/9/71

Inventor(s) J. F. Allen et al

It is certified that error appears in the above-identified patent and that said Letters Patent are hereby corrected as shown below:

Column 1, line 18 "39" should read --35--.

Column 1, line 61 "20°" should read --20°C--.

Column 1, line 66 "$C_{49}ClO_3S$" should read --$C_4H_9ClO_3S$--.

Column 2, line 10 "$n_d^{25}$" should read --$n_D^{25}$--.

Signed and sealed this 10th day of September 1974.

(SEAL)
Attest:

McCOY M. GIBSON, JR.
Attesting Officer

C. MARSHALL DANN
Commissioner of Patents